Patented Oct. 28, 1952

2,615,914

UNITED STATES PATENT OFFICE 2,615,914

ALKYL CARBONATES OF LACTATES

Chessie E. Rehberg, Glenside, Pa., assignor to the United States of America as represented by the Secretary of Agriculture No Drawing. Application February 8, 1949, Serial No. 75,283

5 Claims. (Cl. 260—463)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to esters corresponding to the general formula:

R—OCOOCH(CH3)COO—R¹ where R is an alkyl group and R¹ is an alkyl, cycloalkyl, alkoxyethyl, or alkoxyethoxyethyl group.

An object of the invention is the provision of such esters and processes for their preparation. Another object is to provide plastic compositions comprising these esters. Other objects and advantages of the invention will be apparent from the following description.

I have found that esters corresponding to the above-stated general formula wherein the total number of carbon atoms present in the R and R¹ groups is from 8 to 24 inclusive, which possess valuable properties as plasticizers and modifying agents for plastic compositions, can be prepared by reacting an ester of lactic acid corresponding to the formula CH3CHOHCOOR¹ with a chloroformate of the formula ROCOCl, where R and R¹ have the same significance as above. The resulting alkyl carbonates of the lactic acid ester are clear, colorless, practically odorless, mobile, neutral liquids having high boiling points and excellent compatibility with various resinous and plastic materials. These esters are generally compatible with vinyl resins and ethyl cellulose, and when the hydrocarbon radicals in R and R¹ are not too large the esters are also compatible with cellulose acetate.

The R radical of the esters of this invention may be any alkyl group containing from 1 to 16 carbon atoms; it may be methyl, ethyl; a straight chain alkyl like n-propyl, n-butyl, n-amyl, or n-dodecyl and the like, or a branched chain primary or secondary alkyl group like for instance, isobutyl, 2-ethyl-butyl, 2-ethylhexyl, sec.-butyl, 4-methyl-2-pentyl, 6-methylheptyl, 2-heptyl, 2-octyl and so forth. R¹ may be a straight chain or a branched chain primary or secondary alkyl group, or a cycloalkyl like cyclohexyl, methyl cyclohexyl, trimethyl cyclohexyl; or a 2-alkoxyethyl or 2-(2-alkoxyethoxy) ethyl group in which the alkoxy radicals are straight chain or branched chain primary or secondary groups.

In order that the esters corresponding to the aforementioned general formula have boiling points high enough to permit their use as plasticizers, it is necessary that the radicals R and R¹ together contain a minimum of about 8 carbon atoms. If R and R¹ are both very large groups, for example, C16H33, the predominant hydrocarbon nature of the ester will drastically reduce the compatibility of such a compound with commercial synthetic resins. Hence the group of compounds contemplated in this invention embraces those in which the sum of the number of carbon atoms in R and R¹ falls within the range of 8 to 24.

The esters of this invention in which R¹ is a cycloalkyl group have the property of plasticizing vinyl resins so that the resin may be processed, yet do not render the thus plasticized composition too soft and rubbery or elastic. These plasticized compositions are typically tough, strong and flexible but have little elasticity. These properties of the plasticized material are very desirable for such application as the production of rigid molded articles, floor coverings, simulated leather and the like.

By proper choice of the alkoxy radical in the alkoxyethyl and alkoxyethoxyethyl groups of the esters of my invention, compounds may be obtained which are especially efficacious in plasticizing either vinyl resins or cellulose acetate. In general, if the alkoxy group is a lower alkoxy group and R is a lower alkyl group the ester is useful as a plasticizer for cellulose acetate. On the other hand, most satisfactory plasticizing agents for vinyl resins are those alkoxy groups containing esters of this invention which contain at least 4 carbon atoms in the alkoxy group. The alkoxy groups may contain straight or branched primary or secondary alkyl groups. Suitable alkoxy groups include, for example, methoxy, ethoxy, isopropoxy, butoxy, 2-ethylbutoxy, sec-butoxy and 2-ethyl hexyloxy groups.

The esters of this invention are produced by dissolving equimolecular proportions of lactic ester and pyridine in about twice their combined volume of dry ethyl ether. The resulting solution is maintained at about 0° to 10° C. while a molecular equivalent of alkyl chloroformate is added slowly, with stirring. When addition of the chloroformate is complete the mixture is allowed to come to room temperature and is maintained at this temperature for approximately one hour. The reaction mixture is then washed several times with water, and dried. After the ether is removed by distillation the corresponding alkyl carbonate of the lactic acid ester is obtained as the residue, and if desired may be further purified by distillation.

The characteristics of some of the esters obtained by this procedure are shown in the following table:

Table I

| Example # | Compound: ROCOOCH(CH₃)COOR¹ R | Compound: ROCOOCH(CH₃)COOR¹ R¹ | B. P. °C./1mm. | $n_D^{20}$ | $d_4^{20}$ |
|---|---|---|---|---|---|
| 1 | n-Amyl | n-Butyl | 108 | 1.4263 | 0.994 |
| 2 | n-Hexyl | do | 120 | 1.4288 | 0.982 |
| 3 | n-Octyl | do | 139 | 1.4332 | 0.955 |
| 4 | n-Decyl | do | 158 | 1.4362 | 0.955 |
| 5 | n-Dodecyl | do | 175 | 1.4394 | 0.946 |
| 6 | n-Amyl | n-Amyl | 117 | 1.4290 | 0.985 |
| 7 | n-Hexyl | n-Hexyl | 136 | 1.4327 | 0.965 |
| 8 | n-Decyl | n-Decyl | 206 | 1.4440 | 0.932 |
| 9 | Ethyl | 2-Butoxyethyl | 116 | 1.4268 | 1.048 |
| 10 | n-Amyl | do | 137 | 1.4314 | 1.011 |
| 11 | n-Decyl | do | 183 | 1.4392 | 0.964 |
| 12 | n-Amyl | 2(2-Butoxyethoxy) ethyl | 166 | 1.4370 | 1.025 |
| 13 | n-Octyl | do | 190 | 1.4402 | 0.998 |
| 14 | n-Decyl | do | 204 | 1.4422 | 0.986 |
| 15 | n-Dodecyl | do | 220 | 1.4444 | 0.973 |
| 16 | n-Octyl | Methyl | 117 | 1.4304 | 1.001 |
| 17 | n-Decyl | do | 138 | 1.4346 | 0.983 |
| 18 | n-Butyl | n-Dodecyl | 174 | 1.4390 | 0.946 |
| 19 | Ethyl | do | 160 | 1.4366 | 0.957 |
| 20 | do | n-Hexadecyl | 192 | 1.4422 | 0.939 |
| 21 | do | Cyclohexyl | 105 | 1.4436 | 1.074 |

The following examples illustrate the use of the esters of this invention as plasticizing agents.

*Example A.*—The plasticizers were milled into polyvinyl chloride (a copolymer of 95% vinyl chloride and 5% vinyl acetate) on a mill having steam-heated rolls. The plasticized compositions (containing 35% plasticizer) were evaluated by determination of tensile strength, ultimate elongation, modulus at 100% elongation and brittle point. All these tests were made according to conventional procedures using standard equipment and technique well known in the art. The modulus and brittle point of some of the plasticized compositions are shown in Table II. The tensile strength and elongation of all these compositions were satisfactory. Table II also shows comparable data using di-2-ethylhexyl phthalate, an efficient and widely used commercial plasticizer. As judged by modulus and brittle point, most of compounds listed in the table are markedly superior to 2-ethylhexyl phthalate as plasticizers for this vinyl resin.

*Example B.*—Cellulose acetate and ethyl cellulose were each plasticized by dissolving the resin (75 parts by weight) and the esters of Examples 1-21 (25 parts) in acetone, and films of the plasticized resins were cast on glass plates by allowing the solvent to evaporate. If the resin and plasticizer were compatible the resulting films were clear, colorless, tough and flexible; if incompatible, they were opaque or cloudy and generally were hard and brittle or greasy to the touch. All the compounds of Examples 1-21 were compatible with ethyl cellulose, while of those tested only the ethyl carbonates of cyclohexyl and 2-butoxyethyl lactates were compatible with cellulose acetate.

Table II

Properties of plasticized commercial polyvinyl chloride (a copolymer of 95% vinyl chloride and 5% vinyl acetate)

| Plasticizer Used | Modulus at 100% elongation, p. s. i. | Brittle Point, °C. |
|---|---|---|
| Compound of Example 1 | 1,045 | −41 |
| Compound of Example 2 | 1,050 | −40 |
| Compound of Example 3 | 1,140 | −48 |
| Compound of Example 4 | 1,130 | −47 |
| Compound of Example 5 | 1,190 | −59 |
| Compound of Example 6 | 1,010 | −37 |
| Compound of Example 7 | 1,020 | −43 |
| Compound of Example 8 | 1,340 | −46 |
| Compound of Example 9 | 1,310 | −32 |
| Compound of Example 11 | 1,260 | −55 |
| Compound of Example 12 | 990 | −43 |

Table II—Continued

| Plasticizer Used | Modulus at 10% elongation, p. s. i. | Brittle Point, °C. |
|---|---|---|
| Compound of Example 13 | 1,010 | −48 |
| Compound of Example 14 | 1,100 | −51 |
| Compound of Example 15 | 1,290 | −48 |
| Compound of Example 17 | 1,070 | −47 |
| Compound of Example 21 | 1,850 | −7 |
| 2-Ethyl hexyl phthalate (Control) | 1,500 | −32 |

Although in the foregoing examples vinyl resin, and ethyl cellulose, or cellulose acetate were plasticized by combining them with 35 and 25 percent by weight, respectively, of the various esters of this invention, the amount of these plasticizers may be varied depending on the properties desired in the final product. Thus the synthetic resin can be combined with 5 to 50% by weight of an ester of this invention.

The resulting plasticized compositions may also contain other conventional ingredients such as dyes, pigments, fillers and the like.

Having thus described my invention, I claim:
1. A plasticizer of the formula:

R—OCOOCH(CH₃)COOR' where R is alkyl and R' is alkoxyethoxyethyl.
2. A plasticizer of the formula:

R—OCOOCH(CH₃)COOR' where R is n-amyl and R' is 2(2-butoxyethoxy) ethyl.
3. The plasticizer of claim 1 in which R is n-octyl and R' is 2(2-butoxyethoxy) ethyl.
4. The plasticizer of claim 1 in which R is n-decyl and R' is 2(2-butoxyethoxy) ethyl.
5. The plasticizer of claim 1 in which R is n-dodecyl and R' is 2(2-butoxyethoxy) ethyl.

CHESSIE E. REHBERG.

REFERENCES CITED

The following references are of record in the file of this patent:

UNITED STATES PATENTS

| Number | Name | Date |
|---|---|---|
| 2,025,957 | Schneider | Dec. 31, 1935 |
| 2,126,510 | Smith | Aug. 9, 1938 |
| 2,312,963 | Derby | Mar. 2, 1943 |
| 2,369,985 | Safford | Feb. 20, 1945 |
| 2,370,567 | Muskat et al. | Feb. 27, 1945 |
| 2,379,250 | Muskat et al. | June 26, 1945 |
| 2,453,264 | Rehberg | Nov. 9, 1948 |